June 9, 1953 — G. R. GAMERTSFELDER — 2,641,632
IMPEDANCE MEASURING INSTRUMENT
Filed April 3, 1951

INVENTOR.
GEORGE R. GAMERTSFELDER
BY
ATTORNEY.

Patented June 9, 1953

2,641,632

UNITED STATES PATENT OFFICE 2,641,632

IMPEDANCE MEASURING INSTRUMENT

George R. Gamertsfelder, Pleasantville, N. Y., assignor to General Precision Laboratory Incorporated, a corporation of New York Application April 3, 1951, Serial No. 218,980

8 Claims. (Cl. 175—183)

This invention pertains to an instrument for measuring the alternating current impedance of circuit components and more particularly to an instrument adjustable over a wide band of frequencies so that the impedance of any selected component may be determined at any selected frequency or frequencies of applied energy.

Heretofore, instruments employed for this purpose have ordinarily consisted of a four-arm passive component impedance bridge, the unknown impedance being interposed as one of the arms. Such devices, however, necessitate several interdependent adjustments to obtain balance and hence a reading which may be used to determine the impedance of the unknown element. Thus operation is laborious and time consuming and great care must be taken to obtain precise results.

The instant invention, on the other hand, provides an instrument in which only two wholly independent adjustments are required to obtain balance so that results are easily and rapidly obtained. Furthermore these adjustments may be made to read directly in terms of the magnitude and phase angle of the alternating current impedance of the element under test. From these two quantities, here termed $|Z|$ and $\phi$, the resistive component $R_z$ and the reactive component $X_z$ of the impedance at the applied frequency may be determined respectively by the relations $$R_z = |Z| \cos \phi \text{ and } X_z = |Z| \sin \phi$$

One of the purposes of the instant invention is to provide an improved instrumentality for determining the impedance of an unknown element the operation of which requires a minimum of manipulative skill.

An additional purpose of the instant invention is to provide an improved measuring device which may be calibrated to read directly in terms of the magnitude and phase angle of the impedance of the element tested.

A still further purpose of the invention is to provide a device wherein the frequency of the potential utilized for measuring purposes may be varied over a wide range so that the impedance of elements under test may be determined at any desired frequency or at various different applied frequencies.

A further understanding of this invention can be secured from the detailed description and accompanying drawings in which.

Figure 1:
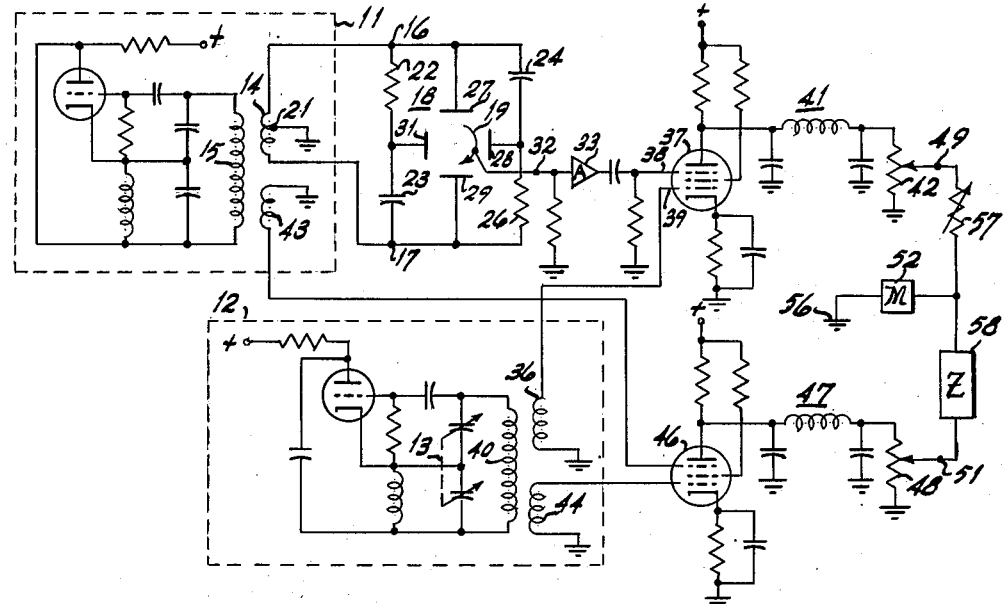
Figure 1 is a schematic diagram of the instrument of the invention.

Referring now to Fig. 1, two electronic oscillators 11 and 12 are provided. Oscillator 12 is made variable in frequency from, say, 900 kc. to 1 mc. by adjustment of the dual condenser 13, while oscillator 11 has a fixed frequency of, say, 1 mc. Although the Colpitts type of oscillator is here illustrated, any of the many well-known types may be employed instead, it being preferable to select a type that is stable with regard to temperature changes and changes in supply voltages. If desired the oscillator frequencies may be made as high as 5 mc. without undue manipulation difficulty, and may be as low as several kilocycles.

The oscillator 11 is provided with a transformer-coupled output comprising a primary 15 and a pair of secondaries 14 and 43. The secondary 14 has its midterminal grounded at 21 and its opposite ends are connected to the input terminals 16 and 17 of a phase shifting network.

This phase shifting network is composed of two branches each consisting of a resistor and condenser connected in series but in inverse order so that similar elements are located in the opposite diagonal arms of the bridge network so formed. As illustrated the resistor 22 and condenser 23 connected in that order between terminals 16 and 17 forms one branch while the condenser 24 and resistor 26 connected in the order named between the terminals 16 and 17 constitutes the second branch. Preferably the resistors 22 and 26 are made equal as are the capacities of the condensers 23 and 24, and likewise at the frequency of the energy applied from the oscillator 11 the reactance of the condensers are equal to the resistances of their associated series resistors.

As will be recognized by one skilled in the art, the phases of the instantaneous potentials existing at the consecutive junctions of each resistor and condenser in such a network are displaced by 90° angles.

Figure 2:
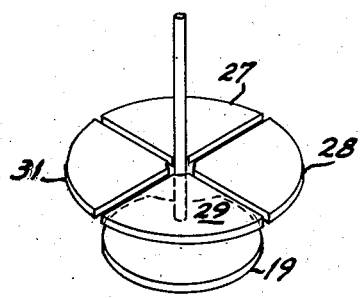
Figure 2 is a view of a condenser used in the circuit of Fig. 1.

These junction terminals are each connected to respective separate fixed plates 27, 28, 29, 31 of a quadrant condenser 18 which also includes a rotating plate 19. This condenser is illustrated in Fig. 2, its form comprising four similar fixed plates in one plane with a single rotor in an adjacent parallel plane. Such a condenser is described in the literature and the exact design of the rotor is completely described in U. S. Patent 2,480,187 issued to the same inventor on August 30, 1949. Therefore the condenser will not be further described. Rotation of the plate 19 of this condenser varies the phase angle of the potential applied to plate 19 through 360 electrical degrees.

While a particular phase shifter has here been described it will be appreciated that other devices such as those employing synchros and the like may be used with equal efficacy, it being only necessary to provide an arrangement so that the potential derived from the oscillator 11 may be shifted by any amount within the entire 360° range.

The oscillator 12 is in all essential aspects like oscillator 11 except that it is adjustable in frequency through the medium of adjustable condensers 13. Like oscillator 11, oscillator 12 is provided with a transformer output consisting of a primary 40 to which are coupled two secondaries 36 and 44. The output derived from the secondary 36 is impressed on the first grid 39 of a pentode modulator 37. At the same time the output derived from oscillator 11 through the medium of the secondary 14, and after having been shifted in phase by the desired amount in the phase shifting network, is applied to the third grid 38 of the pentode modulator 37 through an amplifier 33. The output of the modulator 37 thus consists of signals having the frequency of the signals generated by the oscillators 11 and 12 and signals of the sum and difference of the oscillator signal frequencies. This output after having been filtered to remove all but the difference frequencies by the low pass filter 41 is applied to an adjustable voltage divider 42, which acts to adjust the magnitude of the energy impressed on terminal 49.

Similarly an output signal derived from the oscillator 12 by means of the transformer secondary 44 and an un-phase shifted output signal derived from the oscillator 11 by means of the transformer secondary 43 are applied to the first and third grids respectively of a pentode modulator 46. The modulator 46 likewise is provided with a low pass filter network 47 connected in its output circuit so that the signal applied to the terminal 51 through the adjustable voltage divider 48 constitutes a signal, the frequency of which is the difference frequency of the signals generated by oscillators 11 and 12, the magnitude of which is of course determined by the setting of the voltage divider 48.

The signal existing at the terminal 49 will have the same frequency as the signal existing at the terminal 51, since both are the difference frequency signals derived similarly from the same pair of oscillation generators. Likewise their magnitudes may be adjusted to be equal by adjustment of either or both of the potential dividers 42 and 48.

The frequency of the signal present at these terminals is of course selected by adjustment of the frequency of oscillator 12 by means of the adjustable condensers 13. The relative phase of these signals, however, are made to differ in phase over a range from plus to minus 180° depending on the setting of the quadrant condenser of the phase shifter, it being well known that the phase of a beat frequency signal depends directly on and is variable in accordance with the variation in phase angle of one of the signals which produces such beat frequency signal. Thus the outputs of the voltage dividers 42 and 48 at the terminals 49 and 51 have the same frequency and, when the dividers are set alike, the same voltage magnitude, but have a phase difference equal to the phase angle added to or subtracted from the output of oscillator 12 by the phase shifter connected thereto.

These outputs constitute two arms of a bridge network the remainder of which is composed of a standard calibrated adjustable resistor 57 having one end connected to the terminal 49 and its other end connected to one terminal of the unknown impedance 58 which in turn has its opposite terminal connected to the terminal 51. Thus the calibrated adjustable resistor 57 forms the third arm and the unknown impedance 58 the fourth arm of a four-arm bridge. The balance or null of the bridge so formed is determined by an indicator 52 connected between the juncture of the adjustable resistor 57 and impedance 58 and ground 56. The ground terminal 56 of course constitutes the junction terminal of the filtered outputs of modulators 37 and 46 since both potential dividers 42 and 48 are grounded at their lower terminals.

The indicator 52 may be of any suitable type sensitive to alternating current in the frequency range to be measured as for example, a crystal rectifier meter, thermocouple meter, telephone receiver, oscilloscope, or the like.

It will be apparent that, when the bridge is balanced and no current flows through the indicator 52, the following equalities are true:

$$\frac{|E_1|}{|E_2|} = \frac{R}{|Z|} \qquad (1)$$

$$\phi = \theta \qquad (2)$$

wherein $|E_1|$ and $|E_2|$ are the voltages of the beat frequency generators 37 and 46 across the terminals 49—56 and 51—56, R is the resistance of the resistor 57, $|Z|$ the impedance at the frequency employed of the unknown element 58 under test, $\theta$ is the phase angle of the beat frequency generator 37 referred to generator 46, and $\phi$ is the phase angle of the element 58 under test. The component terms of Equation 1 are magnitudes of vector quantities and all four electrical bridge components may be considered to be vector or complex quantities, the phase angle of the resistor being zero. Inspection of Equation 1 shows that the bridge can be balanced either by varying R or by changing the ratio $|E_1|$ to $|E_2|$, in both cases also varying $\phi$ until it equals $\theta$. In both operations the null indicator indicates whether the change betters or worsens the balance of the bridge. If the variable resistor is employed to balance the bridge $|E_1|$ and $|E_2|$ are made equal by adjusting the voltage dividers 42 and 48, and the bridge is direct reading, the calibration of the resistor 57 at null being numerically equal to the impedance of the impedor 58. If the ratio of the voltage is employed to balance the bridge the resistor 57 is a fixed standard and the value of the unknown impedance is computed by multiplying the resistance by the ratio of the voltage dividers at null. The voltage dividers are, of course, calibrated with suitable scales as is the quadrant condenser 18.

The resistance and reactance of the impedor 58 at the frequency of the test are as stated found from the simple relations $$R_z = |Z| \cos \phi \quad (3)$$

and $$X_z = |Z| \sin \phi \quad (4)$$

in which $R_z$ is the resistance of the impedor and $X_z$ the reactance of the impedor.

What is claimed is:

1. An impedance measuring instrument comprising, first and second sources of alternating current of the same frequency connected in series across a series network composed of a calibrated adjustable impedance and an impedance element of unknown magnitude, means for adjusting the phase of one of said alternating current sources relative to the other, and a null indicator connected in circuit with said alternating current sources and said impedances for indicating the balance or unbalance of bridge circuit so formed.

2. An impedance measuring instrument comprising, first and second sources of alternating current of the same frequency connected in series, a series network connected in shunt thereto including a calibrated adjustable resistor and an impedance element of unknown magnitude, means for adjusting the phase of one of said alternating current sources relative to the other, and a null indicator connected between the juncture of said resistor and impedance and the juncture of said alternating current sources.

3. An impedance measuring instrument comprising, first and second sources of alternating current, the signal frequencies of which are equal, said alternating current sources being connected in series, a network connected in shunt to said alternating current sources, said network including a calibrated adjustable resistor and an impedance the magnitude of which is to be determined, means for adjusting the phase of one of said alternating current sources relative to the other, means for adjusting the relative magnitudes of the energy derived from said alternating current sources and impressed on said network, and a null indicator connected between the juncture of said resistor and impedance and the juncture of said alternating current sources.

4. An impedance measuring instrument comprising, first and second oscillation generators, a first modulator, circuit means for impressing signals generated by each of said first and second oscillation generators on said first modulator whereby a beat frequency signal is obtained, a second modulator, means for impressing a signal generated by one of said oscillation generators on said second modulator, means for phase shifting a signal generated by the other of said oscillation generators, circuit means for impressing said phase shifted signal on said second modulator, output circuits for said first and second modulators forming one branch of a four arm bridge circuit, the remaining arms of which consist of an adjustable calibrated impedance and an impedance whose magnitude is unknown, and a null indicator connected between the juncture of said modulator output circuits and the juncture of said adjustable and unknown impedance.

5. An impedance measuring instrument comprising, a first fixed frequency oscillation generator, a second oscillation generator including means for varying the frequency of the signals generated thereby, a first modulator, circuit means for impressing signals generated by each of said first and second oscillation generators on the input of said first modulator, a second modulator, means for impressing a signal generated by one of said oscillation generators on the input of said second modulator, means for varying the phase of a signal generated by the other of said oscillation generators, circuit means for impressing the phase varied signal on said second modulator, said first and second modulators having output circuits connected in series to form one branch of a four arm bridge circuit, an adjustable resistor in the third arm and an impedance whose magnitude is unknown in the fourth arm of said bridge circuit, and a null indicator connected juncture of said adjustable resistor and unknown impedance.

6. An impedance measuring instrument comprising, first and second oscillation generators, a first modulator, means for impressing signals generated by each of said oscillation generators on said first modulator whereby a heat frequency signal is obtained, a second modulator, means for impressing a signal generated by one of said oscillation generators on said second modulator, circuit means including adjustable phase shifting means interconnecting an output circuit of the other of said oscillation generators and said second modulator, output circuits for said first and second modulators including amplitude adjusting means, said output circuits being connected in series to form one branch of a four arm bridge circuit, an adjustable calibrated resistance in the third arm and an impedance whose magnitude is unknown in the fourth arm of said bridge circuit, and a null indicator connected between the juncture of said modulator outputs and the juncture of said adjustable calibrated resistance and unknown impedance.

7. An impedance measuring instrument comprising, a first oscillation generator generating oscillatory signals of a fixed frequency, a second oscillation generator including means for varying the frequency of the signals generated thereby, a first modulator, circuit means for impressing signals generated by each of said oscillation generators on said first modulator, a second modulator, means for impressing a signal generated by said second oscillation generator on said second modulator, circuit means including adjustable calibrated phase shifting means interconnecting an output of said first oscillation generator and said second modulator, output circuits for said first and second modulators including amplitude adjusting means, said output circuits being connected in series and forming one branch of a four arm bridge circuit, an adjustable calibrated resistance forming the third arm and an impedance whose magnitude is undetermined forming the fourth arm of said bridge circuit, and a null indicator connected between the juncture of said modulator outputs and the juncture of said third and fourth arms.

8. An impedance measuring instrument comprising, a first oscillation generator generating oscillatory signals of a fixed frequency, a second oscillation generator including means for varying the frequency of the signals generated thereby, a first modulator including a pair of input electrodes and an output circuit, circuit means interconnecting the output of one of said oscillation generators with one of said input electrodes, and circuit means interconnecting the output of the other of said oscillation generators with the other of said input electrodes, a second modulator including a pair of input electrodes and an output circuit, circuit means interconnecting the output of said second oscillation generator and an input electrode of said second modulator, an adjustable calibrated phase shifting circuit interconnected between the output of said first oscillation generator and the other input electrode of said second modulator, amplitude adjusting means connected in the output circuit of at least one of said modulators, said modulator output circuits being connected in series, an adjustable calibrated resistance and an impedance of unknown value connected in series with each other and across said series connected modulator output circuits, and a null indicator connected between the juncture of said output circuits and the juncture of said calibrated resistance and said impedance.

GEORGE R. GAMERTSFELDER.

References Cited in the file of this patent

UNITED STATES PATENTS

| Number | Name | Date |
|---|---|---|
| 1,847,127 | Mayer | Mar. 1, 1932 |
| 2,146,073 | Jennens et al. | Feb. 7, 1939 |
| 2,149,756 | Arenberg et al. | Mar. 7, 1939 |
| 2,232,792 | Levin | Feb. 25, 1941 |